Patented June 24, 1952

2,601,375

UNITED STATES PATENT OFFICE 2,601,375

RECOVERY OF GLYCERIDES FROM TANK SETTLINGS

Maurice M. Durkee, Decatur, Ill., assignor to A. E. Staley Manufacturing Company, Decatur, Ill., a corporation of Delaware No Drawing. Application April 17, 1950, Serial No. 156,505

4 Claims. (Cl. 260—412.5)

This invention relates to the recovery of vegetable oils from sludges or settlings which accumulate in storage tanks. More particularly, it relates to the recovery of these glycerides where the settlings contain a substantial proportion of vegetable oil meal.

In the recovery of vegetable oils from oil-bearing seeds, e. g. soybeans, corn, cottonseeds and peanuts, the oil is separated by a pressure device such as an expeller or by a solvent extraction method. Regardless of the separation method employed, the oil tends to be contaminated with very small and often colloidal size seed or oil meal particles and other non-liquid impurities, such as phosphatides.

When the oil is accumulated in storage tanks prior to later shipment or refining, these impurities tend to settle out in the tank as sludge or settlings. This sludge accumulation proves to be quite troublesome since it reduces the effective capacity of the tank and imposes the ever-present hazard that some of this material may be accidentally and undesirably drawn off with the oil, whence it would complicate refining procedure or contaminate a shipment of the oil.

The disposal of this sludge presents an additional problem. Since it contains a large proportion of oil it is uneconomical to discard it and yet it is very difficult to separate the oil from the associated impurities, most of which are non-liquid. For example, it is practically impossible to separate the oil by filtering the sludge. Efforts to recover the oil by conventional alkali refining have proven very unsatisfactory and uneconomical. A large excess of alkali is required and a very poor recovery of oil is realized, normally only about 5 to 20% of the oil being recovered by this method.

This alkali refining must be done by the batch or kettle refining procedure, in which a high loss of oil is accepted as being unavoidable. The sludge cannot be alkali refined continuously because the centrifuge bowl is soon choked with the swollen, caustic-modified solids. The high oil losses are apparently due to these swollen particles entrapping considerable oil. The alkali refining method is also complicated by the variations in the amount of meal in the settlings, since this partially determines how much caustic is required for the alkali refining. Many laboratory cup tests must be made each time and even then results of the tests are not very reliable on being transferred to a large scale batch operation.

Accordingly, a principal object of this invention is to provide an improved, practical, economical method for the recovery of fatty material from vegetable oil tank settlings containing substantial proportions of solid or semi-solid components such as meal and phosphatides.

A far superior method has now been developed for processing these tank settlings which is readily followed, economical and results in a good recovery of the oil. This process consists essentially of mixing and heating the sludge with water, whence the hot mixture is allowed to cool and settle. The oil forms an upper layer and the water and impurities form a layer beneath the oil. The oil may then be easily siphoned off and further refined. The oil recovery often runs up to about 90%.

The bottom aqueous layer is made up of water, meal, phosphatides, oil and miscellaneous other materials. It may then be treated with alkali, followed by acidulation, whereupon more of the oil is recovered in the form of free fatty acids. This additional recovery step raises the total proportion of fatty material recovered from the sludge to still higher percentage values.

The sludge should first be sampled and analyzed to determine how much meal, oil and water are present. The analysis may also include the free fatty acid (FFA) and amount of phosphatides. This analysis is necessary to determine how much water should be used in the treatment.

Tests show that the proportion of water to be added may suitably range up to 50% of the weight of the sludge, more water being effective but superfluous. The amount of water depends in part upon the percentage of meal in the sludge, it ordinarily being suitable to add several parts of water for each part of meal present. However, since the sludge is a very complicated mixture, it is difficult to establish a definite rule on this point, for the variation in the concentration of other components seems to have a determining effect. Thus, when the phosphatides are present in relatively large concentration, the settling phase of the process is complicated. The separation is less sharp and requires a longer time to effect.

The pH of the water used in the treatment does not appear to be a critical factor. Satisfactory results are obtained in the pH range of 3 to 11. Lower pH values do not appear to be desirable or necessary. Higher pH values result in appreciable saponification.

The mixture of sludge and water should be heated to about 200° F., although the range of 190° F. up to the boiling temperature is effective in many cases. A temperature of 175° F. appears to be the minimum temperature for obtaining desirable results.

The sludge and water should be agitated sufficiently to insure thorough mixing but the agitation should not be so violent as to counteract the tendency toward flocculation which later develops. During the heating step of the process the sludge-water mixture appears to go through certain steps or phases which are readily detected. The mixture has the appearance of an emulsion at first but at about 140° F. there is frequently noted a tendency toward flocculation. As the temperature rises this tendency increases, the flocs tending to agglomerate and grow in size. Due to this agglomeration the solid materials show a marked tendency to settle out.

The following examples will serve to illustrate the invention, although it is to be understood that they are illustrative only and not determinative of the scope of the invention.

EXAMPLE 1

Corn oil tank settlings

A quantity of corn oil tank settlings weighing 54,350 pounds containing 15.0% meal, 7.9% phosphatides, 4.0% water; the balance consisting of free fatty acids (4.9%) and oil (68.2%) was placed in a tank. The oil and free fatty acid thus amount to about 39,740 pounds.

22,000 pounds of water, equalling about 40.5% of the sludge weight was now added with thorough agitation and the mixture heated by means of steam coils to 208° F. During the heating, at a temperature of about 201° F., there appeared to be a thermal effect, perhaps due to some exothermic chemical reaction among the components of the mixture, which resulted in a moderate and rapid temperature rise. The heating and agitation were now discontinued and the mixture allowed to stand and settle for two days. The bottom layer, or "foots," was pumped to the acidulators and the upper layer of oil was alkali refined in a normal manner. This upper layer of oil weighed 37,600 pounds, representing a direct recovery of 69.2% of oil.

The foots were saponified with caustic soda and then acidulated with sulfuric acid, whence 7,322 pounds of acidulated soapstock were obtained. This soapstock contained 89.7% or 6,550 pounds of free fatty acid. This raises the total fat recovery to about 82% of the oil originally present in the sludge. This represents a 5 to 10 fold increase over that which could be expected by an alkali refining process.

EXAMPLE 2

Corn oil tank settlings 36,860 pounds of sludge containing 5.4% meal, 4.9% phosphatides, 2.9% water, 6.6% FFA, the balance being oil (82.2%) was treated as in Example 1, except that water to the extent of 25% of the weight of the sludge was used and the temperature was carried to only 200° F.

22,854 pounds of oil was recovered in the top layer after settling for four days. This represents a recovery of 88.2% of oil. Alkali refining trials on the sludge had shown a recovery of only 10%. The foots were further refined as in Example 1, raising the total recovery of fatty material to 95.6%.

EXAMPLE 3

Soybean oil tank settlings 100 parts of soybean oil tank settlings containing 7.1% meal, 11.6% phosphatides, 0.5% moisture, 1.7% FFA and the balance soybean oil (79.1%), was treated similarly to the material in Example 1. The amount of water used was 25% of the weight of the sludge and the mixture was heated to only 190° F. Of the 79 parts of oil originally present in the sludge, 43 parts or 54% was recovered from the upper layer after settling for one day. Alkali refining loss tests on soybean oil tank settlings occasionally run as high as 95%.

Yields of oil recovered are increased by permitting the heated mixtures to stand longer intervals before removing the oil layer, but this advantage must be balanced against available tank capacity and operating requirements.

It will be obvious to those skilled in the art of vegetable oil refining that the process of this invention may be modified in various ways to meet the needs of the particular problem. Since the composition and character of the sludge will vary considerably, the proportions of water added and other variables could be adjusted to suit the requirements, which could be readily established by preliminary laboratory tests. All of these variations are comprehended by the invention as above described.

What is claimed as new is:

1. The process of treating crude vegetable oil tank settlings containing meal, phosphatides, and other impurities, said settlings being obtained from storage tanks in which crude oil has been temporarily stored prior to any refining operation, to recover the oil therefrom, comprising: adding a substantial proportion of water to the settlings, agitating and heating the mixture, allowing the mixture to cool and settle to form an upper layer of oil and a lower, aqueous layer containing the impurities and then separating the oil.

2. The process of claim 1 wherein the lower, aqueous layer is subsequently treated with alkali and then with acid, whereby fatty material is released as free fatty acids, and said fatty acids then separated.

3. The process of claim 1 wherein the settlings-water mixture is heated to a temperature within the range of 175° F. up to the boiling temperature of the mixture.

4. The process of claim 3 wherein the amount of water added to the settlings is within the range of 10% to 50%, based on the weight of the settlings.

MAURICE M. DURKEE.

REFERENCES CITED

The following references are of record in the file of this patent:

UNITED STATES PATENTS

| Number | Name | Date |
|---|---|---|
| 1,094,430 | Epler | Apr. 28, 1914 |
| 1,232,913 | Hagemann | July 10, 1917 |
| 1,247,782 | Ayres, Jr. | Nov. 27, 1917 |
| 2,276,822 | Stewart | Aug. 27, 1918 |